(12) United States Patent
Noguchi et al.

(10) Patent No.: US 10,003,072 B2
(45) Date of Patent: Jun. 19, 2018

(54) POSITIVE ELECTRODE ACTIVE MATERIAL FOR SECONDARY BATTERY, METHOD FOR PRODUCING SAME AND SECONDARY BATTERY

(71) Applicant: NEC Corporation, Tokyo (JP)

(72) Inventors: Takehiro Noguchi, Tokyo (JP); Makiko Takahashi, Tokyo (JP); Shin Serizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 200 days.

(21) Appl. No.: 15/101,792

(22) PCT Filed: Nov. 5, 2014

(86) PCT No.: PCT/JP2014/079370
§ 371 (c)(1),
(2) Date: Jun. 3, 2016

(87) PCT Pub. No.: WO2015/083481
PCT Pub. Date: Jun. 11, 2015

(65) Prior Publication Data
US 2016/0308199 A1    Oct. 20, 2016

(30) Foreign Application Priority Data
Dec. 4, 2013    (JP) .................. 2013-250861

(51) Int. Cl.
*H01M 4/36* (2006.01)
*C01G 45/12* (2006.01)
(Continued)

(52) U.S. Cl.
CPC ........ *H01M 4/366* (2013.01); *C01G 45/1242* (2013.01); *C01G 53/54* (2013.01);
(Continued)

(58) Field of Classification Search
None
See application file for complete search history.

(56) References Cited

U.S. PATENT DOCUMENTS 8,906,553 B1 * 12/2014 Hagh .................... H01M 4/366
                                                        252/521.2
9,825,284 B2 * 11/2017 Binder ................ H01M 4/1315
(Continued)

FOREIGN PATENT DOCUMENTS

JP      11-339805      12/1999
JP      2002-158007    5/2002
(Continued)

OTHER PUBLICATIONS

H.-M. Cho et al., "Effect of Ni/Mn Ordering on Elementary Polarizations of $LiNi_{0.5}Mn_{1.5}O_4$ Spinel and Its Nanostructured Electrode", Journal of the Electrochemical Society, 160 (9) A1482-A1488, 2013.

(Continued)

*Primary Examiner* — Scott J Chmielecki
(74) *Attorney, Agent, or Firm* — Finnegan, Henderson, Farabow, Garrett & Dunner, L.L.P.

(57) ABSTRACT

A secondary battery having an improved life characteristics is provided by the use of a positive electrode active material for a secondary battery, comprising (a) a surface layer comprising a lithium metal composite oxide having a spinel crystal structure represented by space group Fd-3m, and (b) an internal portion comprising a lithium metal composite oxide having a spinel crystal structure represented by space group $P4_332$.

15 Claims, 3 Drawing Sheets

(51) Int. Cl.
- *H01M 4/505* (2010.01)
- *H01M 4/525* (2010.01)
- *H01M 4/131* (2010.01)
- *C01G 53/00* (2006.01)
- *H01M 4/04* (2006.01)
- *H01M 4/50* (2010.01)
- *H01M 4/52* (2010.01)
- *H01M 10/0525* (2010.01)

(52) U.S. Cl.
CPC ......... *H01M 4/0471* (2013.01); *H01M 4/131* (2013.01); *H01M 4/502* (2013.01); *H01M 4/505* (2013.01); *H01M 4/523* (2013.01); *H01M 4/525* (2013.01); *H01M 10/0525* (2013.01); *C01P 2002/76* (2013.01); *C01P 2002/85* (2013.01); *C01P 2004/84* (2013.01); *C01P 2006/40* (2013.01)

(56) References Cited

U.S. PATENT DOCUMENTS

| | | | |
|---|---|---|---|
| 2008/0107968 A1* | 5/2008 | Patoux | H01M 4/485 429/223 |
| 2009/0081558 A1 | 3/2009 | Inagaki et al. | |
| 2012/0068129 A1 | 3/2012 | Jouanneau et al. | |
| 2015/0089797 A1* | 4/2015 | Binder | C01G 45/1242 29/623.1 |
| 2016/0308199 A1* | 10/2016 | Noguchi | H01M 4/523 |
| 2017/0309908 A1* | 10/2017 | Mitsumoto | H01M 4/505 |

FOREIGN PATENT DOCUMENTS

| | | |
|---|---|---|
| JP | 2009-80979 | 4/2009 |
| JP | 4683527 | 5/2011 |
| JP | 4770113 | 9/2011 |
| JP | 2012-190648 | 10/2012 |
| JP | 2013-89389 | 5/2013 |
| JP | 2013-93167 | 5/2013 |
| JP | 2013-93170 | 5/2013 |
| JP | 2014-110176 | 6/2014 |

OTHER PUBLICATIONS

J.-H. Kim et al., "Effect of Ti Substitution for Mn on the Structure of $LiNi_{0.5}Mn_{1.5-x}Ti_xO_4$ and Their Electrochemical Properties as Lithium Insertion Material", Journal of the Electrochemical Society, 151 (11) A1911-A1918, 2004.

L. Guoqiang, $LiNi_{0.5}Mn_{1.5}O_4$ Spinel and Its Derivatives as Cathodes for Li-Ion Batteries, Lithium Ion Vatteries-New Developments, In Tech, pp. 83-100, Feb. 2012.

International Search Report and Written Opinion dated Jan. 13, 2015, in corresponding PCT International Application.

* cited by examiner

POSITIVE ELECTRODE ACTIVE MATERIAL FOR SECONDARY BATTERY, METHOD FOR PRODUCING SAME AND SECONDARY BATTERY

CROSS-REFERENCE TO RELATED PATENT APPLICATIONS

This application is a National Stage Entry of International Application No. PCT/JP2014/079370, filed Nov. 5, 2014, which claims priority from Japanese Patent Application No. 2013-250861, filed Dec. 4, 2013. The entire contents of the above-referenced applications are expressly incorporated herein by reference.

TECHNICAL FIELD

The present invention relates a secondary battery positive electrode active material, and more particularly to a positive electrode active material having a spinel crystal structure; and further relates to a method for producing the same and a positive electrode and a secondary battery using the positive electrode active material.

BACKGROUND ART

Lithium secondary batteries (inclusive of lithium ion secondary batteries) are widely utilized in portable electronic equipment, personal computers, and the like. While miniaturization and weight reduction are required for the lithium secondary batteries, increasing the energy density is an important problem to be solved.

There are several methods for increasing the energy density of a lithium secondary battery, and among them, increasing the operating voltage of a battery is effective. A lithium secondary battery using lithium cobaltate or lithium manganate as a positive electrode active material has an average operating voltage of 3.6 to 3.8 V (4 V class) versus a metal lithium reference. This is because the operating voltage is defined by the oxidation-reduction reaction of cobalt ions or manganese ions ($Co^{3+} \leftrightarrows Co^{4+}$ or $Mn^{3+} \leftrightarrows Mn^{4+}$).

On the other hand, a spinel compound in which a part of manganese in lithium manganate is replaced by nickel or the like, specifically $LiNi_{0.5}Mn_{1.5}O_4$ or the like, shows a potential plateau in a region of 4.5 V or more. Therefore, by using the spinel compound of this type as a positive electrode active material, 5 V class operating voltage can be achieved. In a positive electrode using the spinel compound, manganese is present in the tetravalent state, and the operating voltage of the battery is defined by the oxidation-reduction of $Ni^{2+} \leftrightarrows Ni^{4+}$ instead of the oxidation-reduction of $Mn^{3+} \leftrightarrows Mn^{4+}$.

$LiNi_{0.5}Mn_{1.5}O_4$ has a capacity of 130 mAh/g or more and an average operating voltage of 4.6 V or more versus metal lithium, and has smaller lithium absorbing capacity than $LiCoO_2$ but has higher energy density than $LiCoO_2$. For such a reason, $LiNi_{0.5}Mn_{1.5}O_4$ is promising as a positive electrode material.

On the other hand, improvement of the life characteristics is a problem that has always been required in lithium batteries. Various causes are said to be the reason of deterioration of battery life. For example, the decomposition reaction of the electrolytic solution at a contact portion of a positive electrode active material with the electrolyte solution has been pointed out.

In order to suppress the decomposition on the positive electrode active material, there are several techniques for treating the surface of the positive electrode active material. For example, there is a proposal to cover the surface of an active material with a metal oxide, as disclosed in Patent Document 1 and Patent Document 2.

As the reports relating to crystallinity of 5V class positive electrodes, Non-Patent Document 1 and Non-Patent Document 2 are known. Non-Patent Document 1 has shown characteristics such as differences in interfacial resistance depending on the difference in crystal structure due to presence or absence of Ni ordering. Non-Patent Document 2 has shown that the crystal structure of $P4_332$ is obtained even when Mn was replaced with Ti in $LiNi_{0.5}Mn_{1.5}O_4$. Thus, it has been reported that the reactivity with an electrolyte solution at the interface is different depending on the control of the crystal structure, or that it is possible to control the crystallinity of an active material by conditions.

CITATION LIST

Patent Literature

Patent Document 1: Japanese Patent No. 4770113
Patent Document 2: Japanese Patent No. 4683527

Non-Patent Literature

Non-Patent Document 1: Journal of The electrochemical Society, 160 (9) A1482-A1488 (2013)
Non-Patent Document 2: Journal of The electrochemical Society, 151 (11) A1911-A1918 (2013)

SUMMARY OF INVENTION

Technical Problem

It is an object of the present invention to provide a positive electrode active material having a crystal structure of spinel type with improved life characteristics as a positive electrode active material for a secondary battery, and a secondary battery.

Solution to Problem

The present invention relates to a positive electrode active material for a secondary battery, comprising:
(a) a surface layer comprising a lithium metal composite oxide having a spinel crystal structure represented by space group Fd-3m, and
(b) an internal portion comprising a lithium metal composite oxide having a spinel crystal structure represented by space group $P4_332$.

Advantageous Effect of Invention

The constitution of the present invention provides a secondary battery having an improved life characteristic. The present invention is effective in improving the life characteristic of the positive electrode active material having a spinel crystal structure, in particular improving the life characteristic of those containing a positive electrode active material operable at high potential of 4.5V or more vs. lithium, without sacrificing its energy density.

DESCRIPTION OF EMBODIMENT

Particularly, a battery of high-voltage operation, for example, a battery using a positive electrode active material of a high potential, such as $LiNi_{0.5}Mn_{1.5}O_4$, is operated at further higher voltage than batteries using a positive electrode active material such as $LiCoO_2$ or $LiMn_2O_4$. Therefore, the decomposition reaction of an electrolyte solution tends to proceed at the contact portion of the positive electrode with the electrolyte solution. Gas is generated by this decomposition reaction. The generation of gas is a practical problem because it increases the internal pressure of the cell or causes a swelling of the laminate cell. Therefore, the development of a positive electrode material effective to suppress the decomposition of the electrolyte is expected. Since the decomposition of the electrolytic solution occurs mainly at the interface of the positive electrode active material and the electrolytic solution, it is very important to control the surface state of the positive electrode active material. As a method to improve the properties of $LiNi_{0.5}Mn_{1.5}O_4$, it is also important that the positive electrode has a high crystallinity. The high crystallinity enables smooth insertion and desorption of Li.

The present inventors found, after investigating materials excellent in life characteristics, that the effect of improving the life characteristics is obtained by controlling the inside crystal structure and the surface crystal state of the particle of the positive electrode active material.

The secondary battery according to the present embodiment comprises a positive electrode active material particle, in which the internal portion of the positive electrode active material particle has a crystal structure belonging to space group $P4_332$, the surface of the active material particle has a crystal structure belonging to space group Fd-3m. In particular, it was found that a high effect of improving lifetime characteristics is obtained without compromising the energy density when a positive electrode material operable at high potential of 4.5V or more vs. lithium is used.

Preferred embodiments of the present invention will be described.

(Positive Electrode Active Material)

In this embodiment, the positive electrode active material is a lithium metal composite oxide having a surface layer and a particle inner portion, wherein the surface layer and the particle inner portion have a spinel crystal structure represented by space group Fd-3m structure and a spinel crystal structure represented by space group $P4_332$, respectively.

In a more preferred embodiment, the surface layer and the particle inner portion have chemical compositions represented by formula (1) and (2), respectively, namely, $Li_{a1}(M1_{x1}Mn_{2-x1-y1}Y1_{y1})O_4$     (1)

wherein, 0.4≤x1≤1.2, 0≤y1≤1, x1+y1<2, 0≤a1≤1.2; M1 comprises at least one selected from the group consisting of Co, Ni, Fe, Cr and Cu; Y1 is at least one selected from the group consisting of Li, B, Na, Al, Mg, Ti, Si, K and Ca; and $Li_{a2}(M2_{x2}Mn_{2-x2-y2}Y2_{y2})O_4$     (2)

wherein, 0.4≤x2≤1.2, 0≤y2≤1, x2+y2<2, 0≤a2≤1.2; and M2 comprises at least one selected from the group consisting of Co, Ni, Fe, Cr and Cu; Y2 is at least one selected from the group consisting of Li, B, Na, Al, Mg, Ti, Si, K and Ca. With such a positive electrode material, characteristics such as a high capacity and high operational potential can be obtained.

The internal portion of the positive electrode active material particle is preferably a crystal structure of $P4_332$. The crystal structure of the $P4_332$ is similar to Fd-3m. However, taking $LiNi_{0.5}Mn_{1.5}O_4$ as an example, in the lattice point arrangement of Ni and Mn located in 16d sites of Fd-3m, if ordering of Ni is advanced (regularly arranged), a structure of $P4_332$ is generated. It has been reported that depending on manufacturing conditions such as the calcination conditions, $P4_332$ is generated or crystallinity stays in Fd-3m. If a highly crystalline material in which the ordering of Ni is advanced like this material is used, the conductivity of Li ion is improved. This is considered to be due to the increase of diffusion rate of Li during the charging and discharging of the battery.

On the other hand, in the surface of particles of the positive electrode active material, the crystal structure of Fd-3m is preferable. It is assumed that, with Fd-3m structure rather than $P4_332$ structure, the insertion and desorption of Li at the interface of the electrolyte solution and positive electrode surface takes place easily, and as a result, there is an effect of suppressing side reactions of the electrolytic solution at the interface of the electrolyte and the positive electrode.

M1 in formula (1) and M2 in formula (2) is preferably at least one selected from Ni, Cu, Cr, Fe and Co. The use of such elements enables the operation at high potential in the insertion and desorption of Li.

M1 and M2, each preferably comprise at least Ni, and it is also preferable M1 and M2 are Ni. By using Ni, an active material having high operation potential with high capacity can be obtained.

In formula (2), 0.45<x2<0.55 is preferred. With such a range, the structure of $P4_332$ can be easily obtained. On the other hand, even in the equation (1), 0.45<x1<0.55 is very preferable. However, since there is no need of ordering of the M1 element in the structure of Fd-3m, the range of roughly 0.45<x1<0.8 is also a preferred range. With such a range, the surface portion also becomes an active material operable at a high potential with high capacity.

In formulae (1) and (2), Y1 and Y2 each are at least one element selected from Li, B, Na, Al, Mg, Ti, Si, K and Ca, and y1 preferably satisfies 0≤y1≤0.3 and y2 preferably satisfies 0≤y2≤0.3. These elements replace a part of Mn sites. By the substitution by such elements, elution of the constituent elements of the positive electrode active material such as Mn can be suppressed. More preferably, Y1 and Y2 are selected from Li, B, Mg, Al, Si and Ti. This is because these elements are effective in improving performances through the reduction of the elution. Ti is more preferable because it easily replaces Mn, and the decrease in capacity is small even if the amount of substitution is large and it is highly effective in reducing the dissolution of the constituent elements.

The same effect can be obtained even if a part of oxygen of the compound represented by formula (1) and formula (2) is being substituted with small amounts of fluorine or chlorine. Further, the same effect can be obtained even if the compound is in a such state that a small amount of oxygen is deficient.

The positive electrode active materials present in the inside and the surface may have the same composition or different composition. When they are different, the composition of formula (1) constituting the surface layer preferably has a similar composition to formula (2) constituting the inner part of the active material. For example, it is preferable that the elements M1 and M2 are the same. Additionally thereto or independently thereof, the preference is given to the cases that elements Y1 and Y2 are the same (including the case where both elements are not contained), or Y1 is contained (y1≠0) and Y2 is not contained (y2=0). Further, if Y1 is contained, preferably y2/y1≤2 is satisfied (including the case of y2=0).

Because the component of the surface has such a composition that represented by general formula (1), the insertion and desorption of Li takes place in the surface portion, too. If the surface covering component is an electrochemically inactive compound, the capacity is reduced correspondingly. However, because having such a composition that represented by general formula (1), it is possible to suppress the reduction in capacity. Further, since the surface and the internal portion of the crystal structure are similar, the diffusion of Li is facilitated even at the interface between the surface component and the internal component. Owing to these effects, it is possible to suppress a reduction in charge and discharge characteristics.

Further, when considering the reduction of the elution of the constituent elements from the active material, the value of y1 in general formula (1) of the compound in the surface is preferably larger than y2 in general formula (2) of the compound in the internal portion of the particle. By satisfying this, it is possible to reduce the elution of elements from the active material.

The thickness of the surface layer is preferably 1 nm or more and 1 µm or less. This is because if it is 1 nm or less, the effect of the surface layer is reduced, and if it is 1 µm or more, the effect due to the crystal structure of the internal portion is lowered. More preferably, it is 2 nm or more, still more preferably it is 5 nm or more.

The specific surface area of these positive active material is, for example, 0.01 to 5 m$^2$/g, preferably 0.02 to 4 m$^2$/g, more preferably 0.05 to 3 m$^2$/g, further more preferably 0.1 to 2 m$^2$/g. If the specific surface area is within such a range, the contact area with the electrolytic solution can be adjusted in an appropriate range. Namely, by setting the specific surface area to 0.01 m$^2$/g or more, smooth insertion and desorption of lithium ions proceeds easily, leading to further reduction in resistance. Further, by setting the specific surface area to 5 m$^2$/g or less, the promotion of the decomposition of the electrolyte solution and the elution of the constituent elements from the active material can be prevented.

The median particle diameter of the positive electrode active material is preferably 0.01 to 50 µm, more preferably 0.02 to 40 µm. By setting the particle size to 0.02 µm or more, the elution of the constituent elements from the positive electrode material and the deterioration due to contact with the electrolyte can be further suppressed. Further, by setting the particle diameter to 50 µm or less, smooth insertion and desorption of lithium ions proceeds easily, leading to further reduction in resistance. Particle size may be measured by laser diffraction-diffusion particle size distribution measuring apparatus.

In order to prepare a positive electrode active material of the present embodiment, for example, preference is given to a production method having a two-stage process including the steps (A) and (B), as follows. That is, in step (A), particles of the lithium metal composite oxide corresponding to the internal portion of the positive electrode active material are formed, wherein the lithium metal composite oxide is represented by formula (2) and has a crystal structure represented by space group P4$_3$32. The particle size and shape thereof are adjusted in consideration of the size and shape of the final particles.

Method of forming crystals of P4$_3$32 is not particularly limited, but it can be carried out, for example, by mixing a predetermined amount of compounds containing metal elements constituting the inner portion, and if necessary calcining the mixture at elevated temperature (e.g. 800° C. to 1100° C.), then annealing it in a range of about 400° C. to 700° C., preferably 500° C. to 700° C. The annealing time can be appropriately set, but it may be within a range of, for example, 5 hours to 100 hours. It is preferred that the calcining and annealing are carried out in oxidation atmosphere, particularly in an oxygen-rich condition (e.g. in oxygen gas). The examples of the compounds containing metal element(s) include sulfates, nitrates, chlorides, carbonates, oxides, hydroxides, complexes, organic metal compounds and the like.

Then, on the surface of the particles thus formed, lithium metal composite oxide represented by formula (1) and having a crystal structure represented by space group Fd-3m is formed. In this case, it is preferable to form the surface layer so as to cover the entire surface of the particles. Specific methods that can be utilized include a sol-gel method or a neutralization method using precursor solution(s), reaction methods such as a hydrothermal method, a spray coating of colloidal dispersions, a hetero aggregation method using a difference in surface charges in liquid, wet methods such as a coating (or dipping) of precursor solution(s) or dispersion(s), a solid phase method by powder mixing, vapor-phase methods such as CVD and the like. The precursor means compounds containing metal element(s) constituting the surface layer, such as sulfates, nitrates, chlorides, carbonates, oxides, hydroxides, complexes, and organometallic compounds.

After depositing compounds containing metal elements on the surface of the particles, while not particularly limited, the particles are calcined at an elevated temperature as required (e.g. 800° C. to 1100° C.), and then annealed at 200 to 800° C., for example at 700° C. to 800° C. The annealing time can be set appropriately, but it is, for example, 1 hour to 30 hours. The calcination and the annealing are preferable carried out in an oxidizing atmosphere. In other words, the condition of the calcination and the annealing are selected so that the surface layer becomes spinel type crystals, but ordering of M1 element leading to P4$_3$32 structure does not take place and therefore the surface layer stays in Fd-3m structure.

In this way, particles of a positive electrode active material containing a lithium metal composite oxide is obtained, wherein the internal portion comprises a lithium metal composite oxide having a spinel crystal structure represented by space group P4$_3$32 and a surface layer comprises a lithium metal composite oxide having a spinel crystal structure represented by space group Fd-3m. Not limited to the above methods, it is also possible to form a structure having predetermined internal portion and surface layer, for example by using a vapor phase method such as CVD. Forms of the active material in this case are not limited to particles and may be a layered structure.

(Positive Electrode)

Conductive imparting agents for positive electrodes that may be used include acetylene black, carbon black, graphite, or other carbon materials such as fibrous carbons, and in addition, metal materials such as Al, powder of conductive oxides or the like.

Positive electrode binders are not particularly limited, but the examples thereof include polyvinylidene fluoride (PVdF), vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimides, polyamide-imides and the like. Among them, polyvinylidene fluoride is preferred from the viewpoint of versatility and low cost.

As the positive electrode active materials, mainly those represented by formula (2) for the internal portion of the particles and those represented by formula (1) for the surface layer of the particles are used (preferably 70 wt % or more, more preferably 90 wt % or more based on the total of the positive electrode active material), but other active materials may be mixed with them. As other positive electrode active materials that may be used, the examples thereof include positive electrode active materials having a spinel structure represented by $LiM_2O_4$ (M includes at least one or more metal elements such as Mn) other than those represented by formula (1) or formula (2); positive electrode active materials having an olivine-type crystal structure represented by $LiMPO_4$ (M includes at least one or more metal elements such as Fe and Mn); positive electrode active materials having a layered structure represented by $LiMO_2$ (M includes at least one or more metal elements such as Ni, Co, Mn and Fe); NASICON type; lithium-transition metal-silicon composite oxides and the like. The positive electrode active materials may be used alone or in mixture of two or more kinds.

The addition amount of the conductive imparting agent is preferably from 0.5 to 10% by weight (based on the total amount of the positive electrode active material, the conductive imparting agent and the binder), and the addition amount of the binder is also 1 to 10% (based on the total amount of the positive electrode active material, the conductive imparting agent and the binder). This is because, if the proportion of the conductive imparting agent and the binder is small, problems such as poor electronic conductivity or separation of the electrode tend to occur. And if the proportion of the conductive imparting agent and a binder is large, the capacity per cell mass is reduced. The proportion of the positive electrode active material is preferably 70 to 99 wt % (based on the total amount of the positive electrode active material, the conductive imparting agent and the binder), and more preferably 88 to 98% (based on the total amount of the positive electrode active material, the conductive imparting agent and the binder). If the proportion of the positive electrode active material is too small, it is disadvantageous in terms of energy density of the battery. If the proportion of the active material is too large, it is disadvantageous in that problems such as poor electronic conductivity or separation of the electrode tend to occur because the proportion of the conductive imparting agent and binder per mass becomes less.

As the positive electrode current collector, thin metal films composed mainly of Al or the like is preferred. The examples of shapes thereof include a foil, flat plate, mesh and the like.

The positive electrode may be produced by, on a positive electrode current collector, forming a positive electrode active material layer containing a positive electrode active material and a positive electrode binder. As a method of forming the positive electrode active material layer, the examples include a doctor blade method, a die coater method, CVD method, and a sputtering method. After forming the positive electrode active material layer in advance, a positive electrode current collector may be provided by forming a thin film of aluminum, nickel or alloys of these by method such as vapor deposition, sputtering and the like.

(Electrolyte Solution)

As a solvent of the electrolytic solution in the present invention, carbonate-based compounds, carboxylic acid ester compounds, ether compounds, phosphoric acid ester compounds, sulfone compounds and the like may be used. Each solvent may be an open-chain structure or a cyclic structure. Further, these compounds may be partially substituted with an element such as fluorine chlorine. Further, a part of elements may be substituted with a cyano group, an imide group or the like.

The carbonate-based compound are roughly divided into open-chain carbonates and cyclic carbonates.

The cyclic carbonate is not particularly limited. Examples thereof may include ethylene carbonate (EC), propylene carbonate (PC), butylene carbonate (BC), or vinylene carbonate (VC). In addition, the cyclic carbonate includes a fluorinated cyclic carbonate. Examples of the fluorinated cyclic carbonate include compounds obtainable by replacing some or all hydrogen atoms of ethylene carbonate (EC), propylene carbonate (PC), butylene carbonate (BC), vinylene carbonate (VC), or the like by fluorine atoms. More specifically, as the fluorinated cyclic carbonate, 4-fluoro-1,3-dioxolan-2-one, (cis or trans)4,5-difluoro-1,3-dioxolan-2-one, 4,4-difluoro-1,3-dioxolan-2-one, 4-fluoro-5-methyl-1,3-dioxolan-2-one, or the like may be used. Among those listed above, from the viewpoint of voltage resistance and conductivity, ethylene carbonate, propylene carbonate, or compounds obtainable by fluorinating parts of these, or the like is preferred, and ethylene carbonate is more preferred. One cyclic carbonate may be used alone, or two or more cyclic carbonates may be used in combination.

The open-chain carbonate is not particularly limited. Examples thereof include dimethyl carbonate (DMC), ethyl methyl carbonate (EMC), diethyl carbonate (DEC), and dipropyl carbonate (DPC). In addition, the open-chain carbonate includes a fluorinated open-chain carbonate. Examples of the fluorinated open-chain carbonate include compounds obtainable by replacing some or all hydrogen atoms of ethyl methyl carbonate (EMC), dimethyl carbonate (DMC), diethyl carbonate (DEC), dipropyl carbonate (DPC), and the like by fluorine atoms. More specifically, examples of the fluorinated open-chain carbonate include bis(fluoroethyl) carbonate, 3-fluoropropyl methyl carbonate, and 3,3,3-trifluoropropyl methyl carbonate. Among these, dimethyl carbonate and diethyl carbonate are preferred from the viewpoint of voltage resistance and conductivity. One open-chain carbonate may be used alone, or two or more open-chain carbonates may be used in combination.

The carboxylate is not particularly limited. Examples thereof include ethyl acetate, methyl propionate, ethyl formate, ethyl propionate, methyl butyrate, ethyl butyrate, methyl acetate, and methyl formate. In addition, the carboxylate includes a fluorinated carboxylate. Examples of the fluorinated carboxylate include compounds obtainable by replacing some or all hydrogen atoms of ethyl acetate, methyl propionate, ethyl formate, ethyl propionate, methyl butyrate, ethyl butyrate, methyl acetate, or methyl formate by fluorine atoms. Specific examples thereof include ethyl pentafluoropropionate, ethyl 3,3,3-trifluoropropionate, methyl 2,2,3,3-tetrafluoropropionate, 2,2-difluoroethyl acetate, methyl heptafluoroisobutyrate, methyl 2,3,3,3-tetrafluoropropionate, methyl pentafluoropropionate, methyl 2-(trifluoromethyl)-3,3,3-trifluoropropionate, ethyl heptafluorobutyrate, methyl 3,3,3-trifluoropropionate, 2,2,2-trifluoroethyl acetate, isopropyl trifluoroacetate, tert-butyl trifluoroacetate, ethyl 4,4,4-trifluorobutyrate, methyl 4,4,4-trifluorobutyrate, butyl 2,2-difluoroacetate, ethyl difluoroacetate, n-butyl trifluoroacetate, 2,2,3,3-tetrafluoropropyl acetate, ethyl 3-(trifluoromethyl)butyrate, methyl tetrafluoro-2-(methoxy)propionate, 3,3,3trifluoropropyl 3,3,3-trifluoropropionate, methyl difluoroacetate, 2,2,3,3-tetrafluoropropyl trifluoroacetate, 1H,1H-heptafluorobutyl acetate, methyl heptafluorobutyrate, and ethyl trifluoroacetate. Among these, ethyl propionate, methyl acetate, methyl 2,2,3,3-tetrafluoropropionate, 2,2,3,3-tetrafluoropropyl trifluoroacetate, and the like are preferred from the viewpoint of voltage resistance, the boiling point, and the like.

The cyclic carboxylic acid ester is not particularly limited, but the preferred examples thereof include γ-lactones such as γ-butyrolactone, α-methyl-γ-butyrolactone and 3-methyl-γ-butyrolactone, and β-propiolactone, δ-valerolactone and the like. Fluorinated compounds and the like of these may also be used.

The open-chain ether is not particularly limited. Examples thereof include 1,2-ethoxyethane (DEE) or ethoxymethoxyethane (EME). In addition, a fluorinated open-chain ether obtainable by replacing part of the hydrogen of a open-chain ether by fluorine has high oxidation resistance and is preferred for a positive electrode operating at high potential.

Examples of the fluorinated open-chain ether include 2,2,3,3,3-pentafluoropropyl 1,1,2,2-tetrafluoroethyl ether, 1,1,2,2-tetrafluoroethyl 2,2,2-trifluoroethyl ether, 1H,1H,2'H,3H-decafluorodipropyl ether, 1,1,1,2,3,3-hexafluoropropyl-2,2-difluoroethyl ether, isopropyl 1,1,2,2-tetrafluoroethyl ether, propyl 1,1,2,2-tetrafluoroethyl ether, 1,1,2,2-tetrafluoroethyl 2,2,3,3-tetrafluoropropyl ether, 1H,1H,5H-perfluoropentyl-1,1,2,2-tetrafluoroethyl ether, 1H,1H,2'H-perfluorodipropyl ether, 1H-perfluorobutyl-1H-perfluoroethyl ether, methyl perfluoropentyl ether, methyl perfluorohexyl ether, methyl 1,1,3,3,3-pentafluoro-2-(trifluoromethyppropyl ether, 1,1,2,3,3,3-hexafluoropropyl 2,2,2-trifluoroethyl ether, ethyl nonafluorobutyl ether, ethyl 1,1,2,3,3,3-hexafluoropropyl ether, 1H,1H,5H-octafluoropentyl 1,1,2,2-tetrafluoroethyl ether, 1H, 1H, 2'H-perfluorodipropyl ether, heptafluoropropyl 1,2,2,2-tetrafluoroethyl ether, 1,1,2,2-tetrafluoroethyl-2,2,3,3-tetrafluoropropyl ether, 2,2,3,3,3-pentafluoropropyl-1,1,2,2-tetrafluoroethyl ether, ethyl nonafluorobutyl ether, and methyl nonafluorobutyl ether, 1,1-difluoroethyl 2,2,3,3-tetrafluoropropyl ether, bis (2,2,3,3-tetrafluoro propyl) ether, 1,1-difluoroethyl 2,2,3,3,3-pentafluoropropyl ether, 1,1-difluoroethyl 1H,1H-heptafluorobutyl ether, 2,2,3,4,4,4-hexafluorobutyl difluoromethyl ether, bis (2,2,3,3,3-pentafluoro-propyl) ether, nonafluorobutyl methyl ether, bis(1H,1H-heptafluorobutyl) ether, 1,1,2,3,3,3-hexafluoropropyl-1H,1H-heptafluorobutyl ether, 1H,1H-heptafluorobutyl trifluoromethyl ether, 2,2-difluoroethyl 1,1,2,2-tetrafluoroethyl ether, bis(trifluoroethyl) ether, bis(2,2-difluoroethyl) ether, bis(1,1,2-trifluoroethyl) ether, 1,1,2-trifluoroethyl 2,2,2-trifluoroethyl ether.

Among these, from the viewpoint of voltage resistance, the boiling point, and the like, 1,1,2,2-tetrafluoroethyl 2,2,3,3-tetrafluoropropyl ether, 2,2,3,4,4,4-hexafluorobutyl difluoromethyl ether, 1,1-difluoroethyl 2,2,3,3-tetrafluoropropyl ether, 1,1,1,2,3,3-hexafluoropropyl 2,2-difluoro ethyl ether, 1,1-difluoroethyl 1H,1H-heptafluorobutyl ether, 1H,1H,2'H,3H-decafluorodipropyl ether, bis(2,2,3,3,3-pentafluoropropyl) ether, 1H,1H,5H-perfluoropentyl 1,1,2,2-fluoroethyl ether, bis(1H,1H-heptafluorobutyl) ether, 1H,1H,2'H-perfluorodipropyl ether, 1,1,2,3,3,3-hexafluoropropyl 1H,1H-heptafluorobutyl ether, 1H-perfluorobutyl 1H-perfluoroethyl ether is preferred The cyclic ether compounds include cyclic ethers such as tetrahydrofuran, 2-methyltetrahydrofuran, 2,2-dimethyltetrahydrofuran and the like. Materials in which a part of these compounds are substituted with fluorine may also be used.

Examples of the phosphate include trimethyl phosphate, triethyl phosphate, and tributyl phosphate. Examples of the fluorine-containing phosphate include 2,2,2-trifluoroethyl dimethyl phosphate, bis(trifluoroethyl) methyl phosphate, his trifluoroethyl ethyl phosphate, tris(trifluoromethyl) phosphate, pentafluoropropyl dimethyl phosphate, heptafluorobutyl dimethyl phosphate, trifluoroethyl methyl ethyl phosphate, pentafluoropropyl methyl ethyl phosphate, heptafluorobutyl methyl ethyl phosphate, trifluoroethyl methyl propyl phosphate, pentafluoropropyl methyl propyl phosphate, heptafluorobutyl methyl propyl phosphate, trifluoroethyl methyl butyl phosphate, pentafluoropropyl methyl butyl phosphate, heptafluorobutyl methyl butyl phosphate, trifluoroethyl diethyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate, heptafluorobutyl dibutyl phosphate, tris(2,2,3,3-tetrafluoropropyl) phosphate, tris(2,2,3,3,3-pentafluoropropyl) phosphate, tris(2,2,2-trifluoroethyl) phosphate (hereinafter, also abbreviated as PTTFE), tris(1H,1H-heptafluorobutyl) phosphate, and tris(1H,1H,5H-octafluoropentyl) phosphate.

Examples of sulfone compounds that may be used include sulfolane (tetramethylene sulfone), 3-methyl sulfolane and the like as cyclic sulfone-based materials. Examples of open-chain sulfone-based materials include dimethyl sulfone (for example, 3,4-dimethyl sulfone, 2,5-dimethyl sulfone), ethyl methyl sulfone, diethyl sulfone, butyl methyl sulfone, dibutyl sulfone, methyl isopropyl sulfone, diisopropyl sulfone, methyl tert-butyl sulfone, butyl ethyl sulfone, butyl propyl sulfone, butyl isopropyl sulfone, di-tert-butyl sulfone, diisobutyl sulfone, ethyl isopropyl sulfone, ethyl isobutyl sulfone, tert-butyl ethyl sulfone, propyl ethyl sulfone, isobutyl isopropyl sulfone, butyl isobutyl sulfone, isopropyl (1-methyl-propyl) sulfone, pentamethylene sulfone, hexamethylene sulfone, ethylene sulfone, trimethylene sulfone, and the like. These compounds may be used alone or in combination of two or more of these.

Examples of the supporting salt in the electrolyte solution include lithium salts, such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_2$, $LiN(CF_3SO_2)_2$, $LiN(C_2F_5SO_2)_2$, and $LiB_{10}Cl_{10}$. In addition, examples of other supporting salts include lithium lower aliphatic carboxylates, chloroborane lithium, lithium tetraphenylborate, LiBr, LiI, LiSCN, and LiCl. One supporting salt may be used alone, or two or more supporting salts may be used in combination.

As additives for electrolyte solution, carbonate-based compound having an unsaturated bond such as vinylene carbonate (VC), sulfonic acid ester compounds such as 1,3-propane sultone and butane sultone may be used.

An ion-conducting polymer may be added to the nonaqueous electrolytic solution. Examples of the ion-conducting polymer include polyethers, such as polyethylene oxide and polypropylene oxide, and polyolefins, such as polyethylene and polypropylene. In addition, examples of the ion-conducting polymer include polyvinylidene fluoride, polytetrafluoroethylene, polyvinyl fluoride, polyvinyl chloride, polyvinylidene chloride, polymethyl methacrylate, polymethyl acrylate, polyvinyl alcohol, polymethacrylonitrile, polyvinyl acetate, polyvinylpyrrolidone, polycarbonates, polyethylene terephthalate, polyhexamethylene adipamide, polycaprolactam, polyurethanes, polyethylenimine, polybutadiene, polystyrene, or polyisoprene, or derivatives thereof. One ion-conducting polymer may be used alone, or two or more ion-conducting polymers may be used in combination. In addition, polymers comprising various monomers forming the above polymers may be used.

(Negative Electrode)

The negative electrode active material is not particularly limited. Examples thereof include a carbon material capable of absorbing and desorbing lithium ions (a), a metal capable of being alloyed with lithium (b), or a metal oxide capable of absorbing and desorbing lithium ions (c).

As the carbon material (a), graphite, amorphous carbon, diamond-like carbon, carbon nanotubes, or composites thereof can be used. Graphite having high crystallinity has high electrical conductivity and has excellent adhesiveness to a negative electrode current collector formed of a metal, such as copper, and excellent voltage flatness. On the other hand, in amorphous carbon having low crystallinity, the volume expansion is relatively small, and therefore, the effect of relieving the volume expansion of the entire negative electrode is large, and deterioration caused by nonuniformity, such as grain boundaries and defects, does not occur easily. The carbon material (a) can be used alone or in combination with other materials.

As the metal (b), a metal mainly composed of Al, Si, Pb, Sn, Zn, Cd, Sb, In, Bi, Ag, Ba, Ca, Hg, Pd, Pt, Te, La, and the like, or alloys comprising two or more of these, or alloys of these metals or alloys with lithium, or the like can be used. Particularly, the metal (b) preferably comprises silicon (Si). The metal (b) may be used alone or in combination with other materials.

As the metal oxide (c), silicon oxide, aluminum oxide, tin oxide, indium oxide, zinc oxide, lithium oxide, $LiFe_2O_3$, $WO_2$, $MoO_2$, $SiO$, $SiO_2$, $CuO$, $SnO$, $SnO_2$, $Nb_3O_5$, $Li_xTi_{2-x}O_4$ ($1.3 \leq x \leq 4/3$), $PbO_2$, $Pb_2O_5$, or composites thereof can be used. Particularly, the metal oxide (c) preferably comprises silicon oxide. This is because silicon oxide is relatively stable and does not easily cause reactions with other compounds. In addition, one or two or more elements selected from among nitrogen, boron, and sulfur may also be added to the metal oxide (c), for example, in an amount of 0.1 to 5% by mass. By doing this, the electrical conductivity of the metal oxide (c) is improved. The metal oxide (c) may be used alone or in combination with other materials.

In addition, the negative electrode active materials may include, for example, a metal sulfide capable of absorbing and desorbing lithium ions. Examples of the metal sulfide include $SnS$ and $FeS_2$. In addition, examples of the negative electrode active material may include metal lithium, polyacene or polythiophene, or lithium nitride, such as $Li_5$ ($Li_3N$), $Li_7MnN_4$, $Li_3FeN_2$, $Li_{2.5}Co_{0.5}N$, or $Li_3CoN$.

The above negative electrode active materials may be used alone or in a mixture of two or more of these.

As these negative electrode active materials, those in a form of particles may be used, or those formed into a film by vapor-phase deposition method or the like on a current collector may be used. In terms of industrial applications, those in a form of particles are preferable.

The specific surface area of particles of these negative electrode active materials is, for example, 0.01 to 100 $m^2/g$, preferably 0.02 to 50 $m^2/g$, more preferably 0.05 to 30 $m^2/g$ and even more preferably 0.1 to 20 $m^2/g$. If the specific surface area is within such a range, the contact area with the electrolytic solution can be adjusted in an appropriate range. Namely, by setting the specific surface area to 0.01 $m^2/g$ or more, smooth insertion and desorption of lithium ions proceeds easily, leading to further reduction in resistance. Further, by setting the specific surface area to 20 $m^2/g$ or less, the promotion of the decomposition of the electrolyte solution and the elution of the constituent elements from the active material can be prevented.

The negative electrode binder is not particularly limited. Examples thereof include polyvinylidene fluoride (PVdF), vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides, and polyamideimides.

The content of the negative electrode binder is preferably in the range of 0.1 to 30% by mass, more preferably 0.5 to 25% by mass, based on the total amount of the negative electrode active material and the negative electrode binder. By setting the content to 0.5% by mass or more, the adhesiveness between the active materials or between the active material and the current collector is improved, and the cycle characteristics are good. In addition, by setting the content to 30% by mass or less, the active material ratio is improved, and the negative electrode capacity can be improved.

The negative electrode current collector is not particularly limited, and aluminum, nickel, copper, silver, iron, chromium, and alloys thereof are preferred because of electrochemical stability. Examples of its shape include foil, a flat plate shape, and a mesh shape.

The negative electrode can be made by forming a negative electrode active material layer comprising a negative electrode active material and a negative electrode binder on a negative electrode current collector. Examples of the method for forming the negative electrode active material layer include a doctor blade method, a die coater method, a CVD method, and a sputtering method. It is possible to previously form a negative electrode active material layer and then form a thin film of aluminum, nickel, or an alloy thereof by a method such as vapor deposition or sputtering to provide a negative electrode current collector.

(Separator)

The secondary battery may consist of a combination of a positive electrode, a negative electrode, a separator, and a nonaqueous electrolyte as its configuration. Examples of the separator include woven fabrics, nonwoven fabrics, porous polymer films of polyolefins, such as polyethylene and polypropylene, polyimides and porous polyvinylidene fluoride films, and the like, or ion-conducting polymer electrolyte films. These may be used alone or in combination.

(Shape of Battery)

Examples of the shape of the battery include a cylindrical shape, a rectangular shape, a coin type, a button type, and a laminate type. Examples of the package of the battery include stainless, iron, aluminum, titanium, or alloys thereof, or plated articles thereof. As the plating, for example, nickel plating may be used.

Examples of the laminate resin film used in a laminate type include aluminum, aluminum alloy, and titanium foil. Examples of the material of the thermally bondable portion of the metal laminate resin film include thermoplastic polymer materials, such as polyethylene, polypropylene, and polyethylene terephthalate. In addition, each of the numbers of the metal laminate resin films and the metal foil layers is not limited to one and may be two or more.

Figure 1:
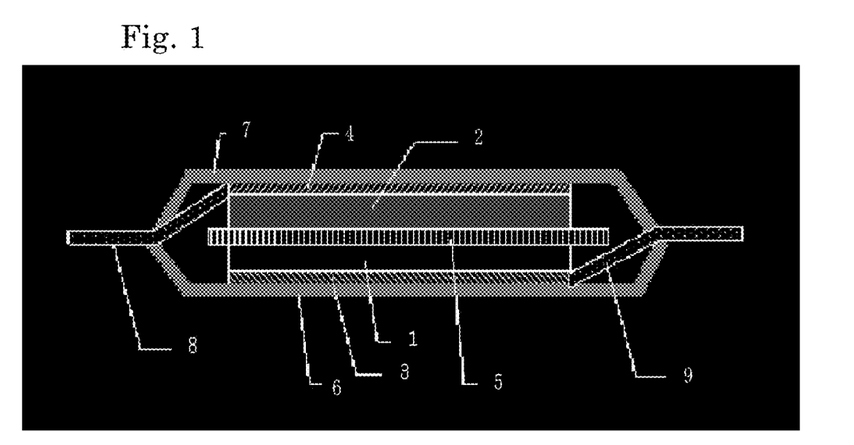
FIG. 1 is one example of a diagram showing the cross-sectional structure of a secondary battery according to the present embodiment.

FIG. 1 shows a structure of a secondary battery according to the present embodiment. The lithium secondary battery comprises a positive electrode active material layer 1 containing a positive electrode active material on a positive electrode current collector 3 formed of a metal, such as aluminum foil, and a negative electrode active material layer 2 containing a negative electrode active material on a negative electrode current collector 4 formed of a metal, such as copper foil. The positive electrode active material layer 1 and the negative electrode active material layer 2 are disposed opposed to each other via an electrolytic solution and a separator 5 formed of a nonwoven fabric, a polypropylene microporous film, or the like comprising the electrolytic solution. In FIG. 1, reference numerals 6 and 7 denote a package, reference numeral 8 denotes a negative electrode tab, and reference numeral 9 denotes a positive electrode tab.

EXAMPLES (Preparation Conditions of Positive Electrode Active Materials)

(Preparation of Positive Electrode Active Material 1)

Raw materials $MnO_2$ and NiO were ground and mixed so that the molar ratio of the elements was Ni/Mn=0.5/1.5, and the mixture was calcined at 950° C. for 8 hours. The obtained NiMn composite oxide and $Li_2CO_3$ were mixed so that the molar ratio of Li, Mn and Ni was Li/Ni/Mn=1/0.5/1.5, and calcined in oxygen at 600° C. for 48 hours.

(Preparation of Positive Electrode Active Material 2)

Raw materials $Li_2CO_3$, $MnO_2$ and NiO were weighed so that the metal composition ratio became a targeted value, and ground and mixed. They were mixed so that the molar ratio of Li, Mn and Ni became Li/Ni/Mn=1/0.5/1.5, and the mixture was calcined at 850° C. for 8 hours.

(Preparation of Positive Electrode Active Material 3)

Acetate salts of lithium, manganese and nickel were mixed so that Li/Ni/Mn=1/0.5/1.5 in molar ratio, and were dissolved in an aqueous solution. This solution and positive electrode active material 1 were mixed so that the ratio of moles of Li+Ni+Mn in the solution to moles of Li+Ni+Mn of the active material particles was adjusted to be 1/9. After mixing, the mixture was dried in an oven at 80° C., and calcined in air at 700° C. for 8 hours.

The obtained positive electrode active material was evaluated with XRD (X-ray diffraction) measurement. The diffraction patterns similar to spinel structure considered $LiNi_{0.5}Mn_{1.5}O_4$ were observed in each case. These particles were cut out to expose a cross section of the particles by ion milling, and subjected to TEM observation. The surface and the internal portion of the particle were evaluated with electron diffraction.

Figure 2:
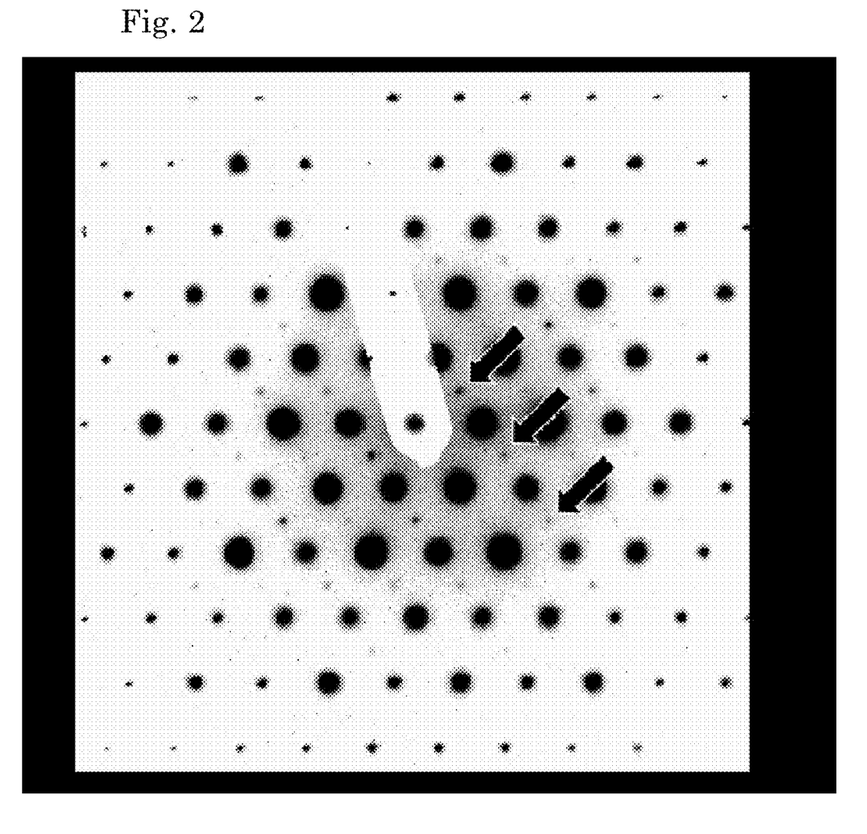
FIG. 2 is a diagram showing an electron beam diffraction pattern of the internal portion of a particle of positive electrode active material 1.
Figure 3:
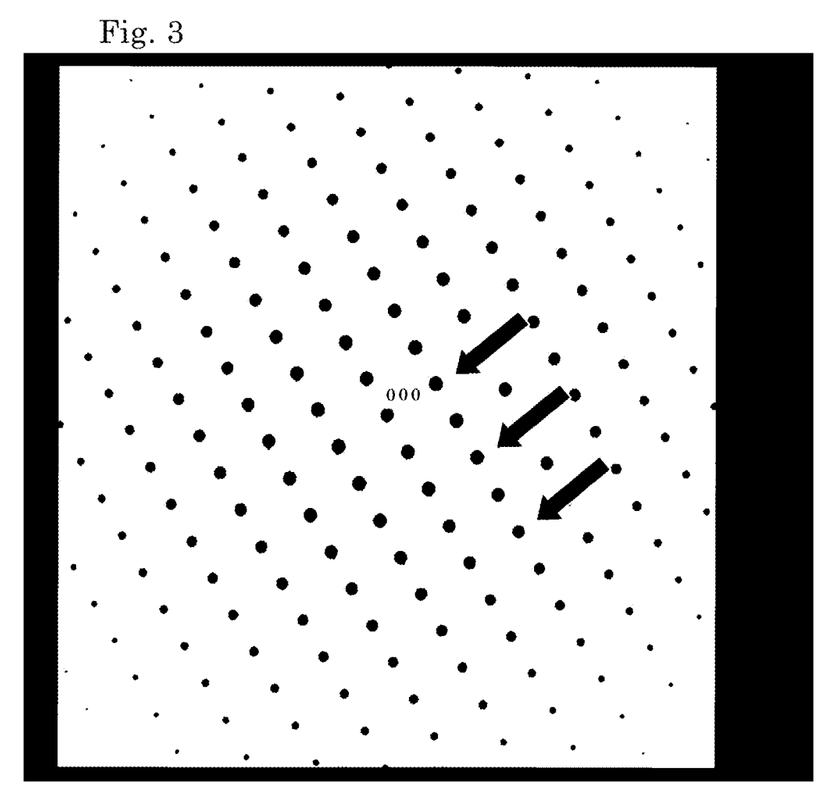
FIG. 3 is a diffraction pattern at[1-10]-incident for $Li_2ZnMn_3O_8$ type structure corresponding to the crystal structure of the $P4_332$.
Figure 4:
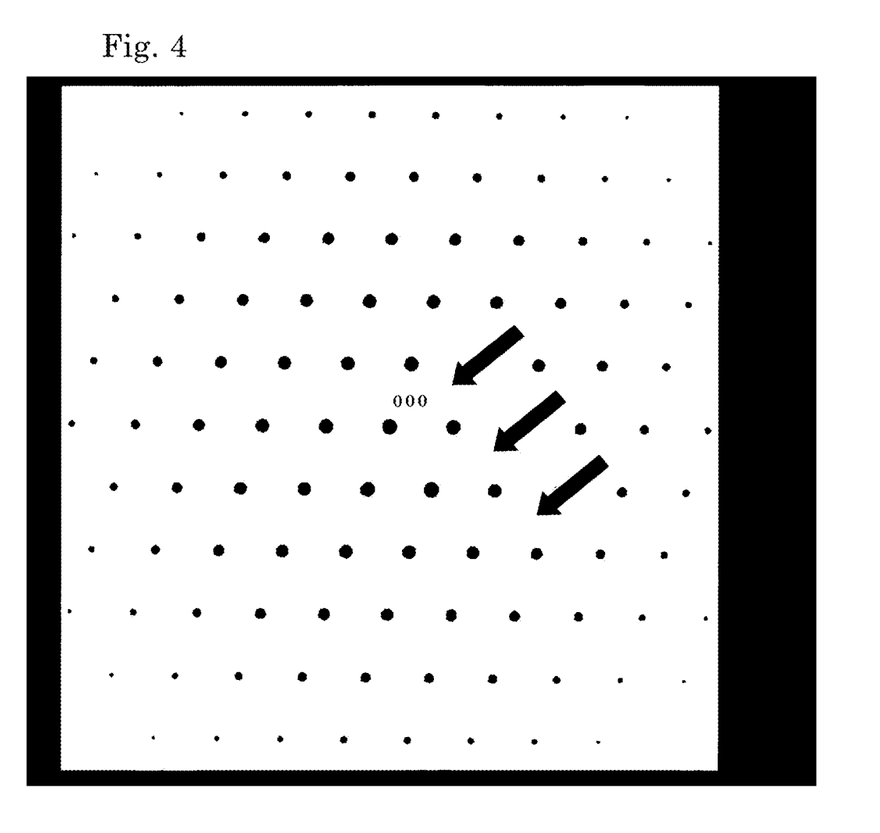
FIG. 4 is a diffraction pattern at[1-10]-incident for spinel ($MgAl_2O_4$) type structure.

FIG. 2 shows an electron beam diffraction pattern of an internal portion of the particle of the positive electrode active material 1. FIG. 3 shows a diffraction pattern for[1-10] incidence of $Li_2ZnMn_3O_8$ type structure corresponding to the crystal structure of $P4_332$, and FIG. 4 shows a diffraction pattern for[1-10] incidence of spinel ($MgAl_2O_4$) type structure. Diffraction spots are seen at locations indicated by arrows in FIG. 2. There are diffraction spots at locations indicated by arrows in FIG. 3 similarly, while there is no such spot at locations indicated by arrows in FIG. 4. From the results, it was confirmed that the internal portion of the particles of the positive electrode active material 1 has $Li_2ZnMn_3O_8$ type structure ($P4_332$ structure).

In a similar manner, the crystal structure was determined at an internal portion of particles and a portion located inside by about 10 nm from the surface of particles as to whether it was $P4_332$ or Fd-3m. For example, in the case of positive electrode active material 2, since diffraction spots assigned to $P4_332$ was not observed, the crystal structure was determined as Fd-3m. The results are shown in Table 1.

TABLE 1

|  | crystal phase at internal portion of particles | crystal phase at surface of particles |
| --- | --- | --- |
| positive electrode active material 1 | $P4_332$ | $P4_332$ |
| positive electrode active material 2 | Fd-3m | Fd-3m |
| positive electrode active material 3 | $P4_332$ | Fd-3m |

As shown in Table 1, samples having different crystal structures have been prepared. In the positive electrode active material 3, there has been produced a positive electrode active material having different crystal structures between at the internal portion and at the surface of the particles.

The positive electrode active materials 1 to 3 thus obtained, polyvinylidene fluoride (5 wt %) as a binder, carbon black (5 wt %) as a conductive agent were mixed to prepare a positive electrode mixture. The positive electrode mixture was dispersed in N-methyl-2-pyrrolidone to prepare a positive electrode slurry. One surface of a 20 µm thick aluminum current collector was uniformly coated with this positive electrode slurry. The thickness of the coating film was adjusted so that the initial charge capacity per unit area was 2.5 mAh/cm². The coated current collector was dried and then compression-shaped by a roll press to make a positive electrode.

As a negative electrode active material, synthetic graphite was used. The synthetic graphite was dispersed in N-methylpyrrolidone in which PVDF is dissolved, to prepare a negative electrode slurry. The mass ratio of the negative electrode active material to the binder was 90/10. A 10 µm thick Cu current collector was uniformly coated with this negative electrode slurry. The thickness of the coating film was adjusted so that the initial charge capacity was 3.0 mAh/cm². The coated current collector was dried and then compression-shaped by a roll press to make a negative electrode.

The positive electrode and the negative electrode cut into 3 cm×3 cm were disposed so as to be opposed to each other via a separator. For the separator, a 25 µm thick microporous polypropylene film was used.

As the nonaqueous electrolytic solution, a solution obtained by mixing ethylene carbonate (EC), tris(2,2,2-trifluoroethyl) phosphate (FP1), and 1,1,2,2-tetrafluoroethyl 2,2,3,3-tetrafluoropropyl ether (FE1) at a volume ratio of EC/FP1/FE1=20/30/50 was used. $LiPF_6$ was dissolved in this nonaqueous electrolytic solution at a concentration of 0.8 mol/l to prepare a nonaqueous electrolytic solution.

The above positive electrode, negative electrode, separator, and electrolytic solution were disposed in a laminate package, and the laminate was sealed to make a lithium secondary battery. The positive electrode and the negative electrode were brought into a state in which tabs were connected and the positive electrode and the negative electrode were electrically connected from the outside of the laminate.

The battery using positive electrode active material 1 was denoted as Comparative Example 1, the battery using positive electrode active material 2 was denoted as Comparative Example 2, and the battery using positive electrode active material 3 was denoted as Example 1.

(Cycle Characteristics)

These batteries were charged at 20 mA, and after the voltage reached the upper limit 4.75 V, the battery was charged at constant voltage until the total charge time reached 2.5 hours. Then, the batteries were discharged at 20 mA at constant current until a lower limit voltage of 3 V was reached. This charge and discharge was repeated 200 times. The cells were disposed in a thermostat chamber at 45° C., and charge and discharge were carried out. The ratio of capacity at the 200th cycle to capacity at the 1st cycle was evaluated as capacity retention ratio after 200 cycles at 45° C. The results are shown in Table 2.

TABLE 2

| | positive electrode active material | crystal structure at internal portion of particles | crystal structure at surface of particles | Capacity retention ratio after 200 cycles at 45° C. |
|---|---|---|---|---|
| Comp. Ex. 1 | positive electrode active material 1 | $P4_332$ | $P4_332$ | 62% |
| Comp. Ex. 2 | positive electrode active material 2 | Fd-3m | Fd-3m | 60% |
| Example 1 | positive electrode active material 3 | $P4_332$ | Fd-3m | 71% |

As shown in Table 2, the retention ratio is high in the case that the surface of the active material has Fd-3m and internal portion has $P4_332$. The reason why this result was obtained is that highly crystalline $P4_332$ is preferable for the movement of Li ions in the internal portion, whereas in the surface, Fd-3m is of lower reactivity at the interface of the positive electrode with the electrolytic solution and the insertion and desorption of Li take place easily. In addition, insertion and desorption of Li are possible also at the surface portion, and therefore the surface portion is capable of performing charging and discharging. Owing to this, there is no reduction in capacity attributed to the surface coating component, and therefore it has an effect of maintaining a high capacity compared with electrochemically inactive covering component. Also, the structure of the internal portion of the particles and the structure of the surface are similar, it is considered that diffusion of Li ions has easily occurred.

Next, similar experiments were also carried out with other active material compositions.

Comparative Example 3

Raw materials $MnO_2$, NiO and $TiO_2$ were ground and mixed so that the molar ratio of the elements was Ni/Mn/Ti=0.5/1.4/0.1, and the mixture was calcined at 950° C. for 8 hours. The obtained NiMnTi composite oxide and $Li_2CO_3$ were mixed so that the molar ratio of Li, Mn, Ni and Ti was Li/Ni/Mn/Ti=1/0.5/1.4/0.1, and calcined in oxygen at 600° C. for 48 hours. The crystal structure was evaluated in the same manner as for positive electrode active material 1, and a battery was manufactured in the same manner as in Comparative Example 1 to prepare the sample of Comparative Example 3.

Comparative Example 4

Raw materials $Li_2CO_3$, $MnO_2$, NiO and $TiO_2$ were ground and mixed so that the molar ratio of Li, Ni, Mn and Ti was Li/Ni/Mn/Ti=1/0.5/1.4/0.1, and the mixture was calcined at 850° C. for 8 hours. The crystal structure was evaluated in the same manner as for positive electrode active material 1, and a battery was manufactured in the same manner as in Comparative Example 1 to prepare the sample of Comparative Example 4.

Example 2

Acetate salts of lithium, manganese, nickel and titanium were mixed so that Li/Ni/Mn/Ti=1/0.5/1.4/0.1 in molar ratio, and were dissolved in an aqueous solution. This solution and positive electrode active material prepared in Comparative Example 3 were mixed so that the ratio of moles of Li+Ni+Mn+Ti in the solution to moles of Li+Ni+Mn+Ti of the active material particles was adjusted to be 1/9. After mixing, the mixture was dried in an oven at 80° C., and calcined in air at 700° C. for 8 hours. The crystal structure was evaluated in the same manner as for positive electrode active material 1, and a battery was manufactured in the same manner as in Comparative Example 1 to prepare the sample of Example 2.

Example 3

Acetate salts of lithium, manganese, nickel and titanium were mixed so that Li/Ni/Mn/Ti=1/0.5/1.2/0.3 in molar ratio, and were dissolved in an aqueous solution. This solution and positive electrode active material prepared in Comparative Example 3 were mixed so that the ratio of moles of Li+Ni+Mn+Ti in the solution to moles of Li+Ni+Mn+Ti of the active material particles was adjusted to be 1/9. After mixing, the mixture was dried in an oven at 80° C., and calcined in air at 700° C. for 8 hours. The crystal structure was evaluated in the same manner as for positive electrode active material 1, and a battery was manufactured in the same manner as in Comparative Example 1 to prepare the sample of Example 3.

Example 4

Acetate salts of lithium, manganese, nickel and titanium were mixed so that Li/Ni/Mn/Ti=1/0.5/1.2/0.3 in molar ratio, and were dissolved in an aqueous solution. This solution and positive electrode active material 1 were mixed so that the ratio of moles of Li+Ni+Mn+Ti in the solution to moles of Li+Ni+Mn+Ti of the active material particles was adjusted to be 1/9. After mixing, the mixture was dried in an oven at 80° C., and calcined in air at 700° C. for 8 hours. The crystal structure was evaluated in the same manner as for positive electrode active material 1, and a battery was manufactured in the same manner as in Comparative Example 1 to prepare the sample of Example 3.

Comparative Example 5

Raw materials $Li_2CO_3$, $MnO_2$, NiO and $Al(OH)_3$ were mixed so that the molar ratio of Li, Mn, Ni, Al was Li/Ni/Mn/Al=1/0.5/1.48/0.02, and the mixture was calcined at 850° C. for 8 hours. The crystal structure was evaluated in the same manner as for positive electrode active material 1, and a battery was manufactured in the same manner as in Comparative Example 1 to prepare the sample of Comparative Example 5.

Example 5

Raw materials $MnO_2$, NiO and $Al(OH)_3$ were ground and mixed so that the molar ratio of the elements was Ni/Mn/Al=0.5/1.48/0.02, and the mixture was calcined at 950° C. for 8 hours. The obtained NiMnAl composite oxide and $Li_2CO_3$ were mixed so that the molar ratio of Li, Mn, Ni and Al was Li/Ni/Mn/Al=1/0.5/1.48/0.02, and calcined in oxygen at 600° C. for 48 hours. Acetate salts of lithium, manganese, nickel and aluminum were mixed so that Li/Ni/Mn/Al=1/0.5/1.48/0.02 in molar ratio, and were dissolved in an aqueous solution. This solution and positive electrode active material prepared above were mixed so that the ratio of moles of Li+Ni+Mn+Al in the solution to moles of Li+Ni+Mn+Al of the active material particles was adjusted to be 1/9. After mixing, the mixture was dried in an oven at 80° C., and calcined in air at 700° C. for 8 hours. The crystal structure was evaluated in the same manner as for positive electrode active material 1, and a battery was manufactured in the same manner as in Comparative Example 1 to prepare the sample of Example 5.

Comparative Example 6

Raw materials $Li_2CO_3$, $MnO_2$, NiO and $Mg(OH)_2$ were mixed so that the molar ratio of Li, Mn, Ni, Mg was Li/Ni/Mn/Mg=1/0.5/1.48/0.02, and the mixture was calcined at 850° C. for 8 hours. The crystal structure was evaluated in the same manner as for positive electrode active material 1, and a battery was manufactured in the same manner as in Comparative Example 1 to prepare the sample of Comparative Example 6.

Example 6

Raw materials $MnO_2$, NiO and $Mg(OH)_2$ were ground and mixed so that the molar ratio of the elements was Ni/Mn/Mg=0.5/1.48/0.02, and the mixture was calcined at 950° C. for 8 hours. The obtained NiMnMg composite oxide and $Li_2CO_3$ were mixed so that the molar ratio of Li, Mn, Ni and Mg was Li/Ni/Mn/Mg=1/0.5/1.48/0.02, and calcined in oxygen at 600° C. for 48 hours. Acetate salts of lithium, manganese, nickel and magnesium were mixed so that Li/Ni/Mn/Mg=1/0.5/1.48/0.02 in molar ratio, and were dissolved in an aqueous solution. This solution and positive electrode active material prepared above were mixed so that the ratio of moles of Li+Ni+Mn+Mg in the solution to moles of Li+Ni+Mn+Mg of the active material particles was adjusted to be 1/9. After mixing, the mixture was dried in an oven at 80° C., and calcined in air at 700° C. for 8 hours. The crystal structure was evaluated in the same manner as for positive electrode active material 1, and a battery was manufactured in the same manner as in Comparative Example 1 to prepare the sample of Example 6.

Comparative Example 7

Raw materials $Li_2CO_3$, $MnO_2$, NiO and $Co_3O_4$ were mixed so that the molar ratio of Li, Mn, Ni, Co was Li/Ni/Co/Mn=1/0.48/0.02/1.5, and the mixture was calcined at 850° C. for 8 hours. The crystal structure was evaluated in the same manner as for positive electrode active material 1, and a battery was manufactured in the same manner as in Comparative Example 1 to prepare the sample of Comparative Example 7.

Example 7

Raw materials $MnO_2$, NiO and $Co_3O_4$ were ground and mixed so that the molar ratio of the elements was Ni/Co/Mn=0.48/0.02/1.5, and the mixture was calcined at 950° C. for 8 hours. The obtained NiMnCo composite oxide and $Li_2CO_3$ were mixed so that the molar ratio of Li, Mn, Ni and Co was Li/Ni/Co/Mn=1/0.48/0.02/1.5, and calcined in oxygen at 600° C. for 48 hours. Acetate salts of lithium, manganese, nickel and cobalt were mixed so that Li/Ni/Co/Mn=1/0.48/0.02/1.5 in molar ratio, and were dissolved in an aqueous solution. This solution and positive electrode active material prepared above were mixed so that the ratio of moles of Li+Ni+Mn+Co in the solution to moles of Li+Ni+Mn+Co of the active material particles was adjusted to be 1/9. After mixing, the mixture was dried in an oven at 80° C., and calcined in air at 700° C. for 8 hours. The crystal structure was evaluated in the same manner as for positive electrode active material 1, and a battery was manufactured in the same manner as in Comparative Example 1 to prepare the sample of Example 7.

Table 3 shows the results of evaluation of crystal structures that were measured by the same manner as for positive electrode active material 1 and the result of evaluation of batteries that were manufactured in the same manner as in Comparative Example 1. Since they are assigned to Fd-3m or $P4_332$ based on the crystal structure evaluation, estimated compositions of crystals are indicated in forms of $LiM_2O_4$ in Table 3.

TABLE 3

| active material composition at internal portion | active material composition at surface | crystal structure at internal portion of active material | crystal structure at surface of active material | Capacity retention ratio after 200 cycles at 45° C. |
|---|---|---|---|---|
| Comp. Ex. 3 | $LiNi_{0.5}Mn_{1.4}Ti_{0.1}O_4$ | $LiNi_{0.5}Mn_{1.4}Ti_{0.1}O_4$ | $P4_332$ | $P4_332$ | 64% |
| Comp. Ex. 4 | $LiNi_{0.5}Mn_{1.4}Ti_{0.1}O_4$ | $LiNi_{0.5}Mn_{1.4}Ti_{0.1}O_4$ | Fd-3m | Fd-3m | 63% |
| Example 2 | $LiNi_{0.5}Mn_{1.4}Ti_{0.1}O_4$ | $LiNi_{0.5}Mn_{1.4}Ti_{0.1}O_4$ | $P4_332$ | Fd-3m | 78% |
| Example 3 | $LiNi_{0.5}Mn_{1.4}Ti_{0.1}O_4$ | $LiNi_{0.5}Mn_{1.2}Ti_{0.3}O_4$ | $P4_332$ | Fd-3m | 82% |
| Example 4 | $LiNi_{0.5}Mn_{1.5}O_4$ | $LiNi_{0.5}Mn_{1.2}Ti_{0.3}O_4$ | $P4_332$ | Fd-3m | 80% |
| Comp. Ex. 5 | $LiNi_{0.5}Mn_{1.48}Al_{0.02}O_4$ | $LiNi_{0.5}Mn_{1.48}Al_{0.02}O_4$ | Fd-3m | Fd-3m | 62% |
| Example5 | $LiNi_{0.5}Mn_{1.48}Al_{0.02}O_4$ | $LiNi_{0.5}Mn_{1.48}Al_{0.02}O_4$ | $P4_332$ | Fd-3m | 72% |
| Comp. Ex. 6 | $LiNi_{0.5}Mn_{1.48}Mg_{0.02}O_4$ | $LiNi_{0.5}Mn_{1.48}Mg_{0.02}O_4$ | Fd-3m | Fd-3m | 63% |
| Example 6 | $LiNi_{0.5}Mn_{1.48}Mg_{0.02}O_4$ | $LiNi_{0.5}Mn_{1.48}Mg_{0.02}O_4$ | $P4_332$ | Fd-3m | 73% |

TABLE 3-continued

| | active material composition at internal portion | active material composition at surface | crystal structure at internal portion of active material | crystal structure at surface of active material | Capacity retention ratio after 200 cycles at 45° C. |
|---|---|---|---|---|---|
| Comp. Ex. 7 | LiNi$_{0.48}$Co$_{0.02}$Mn$_{1.5}$O$_4$ | LiNi$_{0.48}$Co$_{0.02}$Mn$_{1.5}$O$_4$ | Fd-3m | Fd-3m | 57% |
| Example 7 | LiNi$_{0.48}$Co$_{0.02}$Mn$_{1.5}$O$_4$ | LiNi$_{0.48}$Co$_{0.02}$Mn$_{1.5}$O$_4$ | P4$_3$32 | Fd-3m | 70% |

As similar to Table 2, the retention ratio is high in the case that the surface of the active material has Fd-3m and internal portion has P4$_3$32. It is considered that the same effect has been obtained.

As described above, the constitution of the present embodiment provides an effect of improvement in lifetime. Particularly, it is highly effective in the case of using a positive electrode material operable at potential of 4.5V or higher vs. lithium. Therefore, it is possible to provide a lithium secondary battery having long lifetime with a high operating voltage.

REFERENCE SIGNS LIST 1 positive electrode active material layer
2 negative electrode active material layer
3 positive electrode current collector
4 negative electrode current collector
5 separator
6 laminate package
7 laminate package
8 negative electrode tab
9 positive electrode tab

The invention claimed is:

1. A positive electrode active material for a secondary battery, comprising:
   (a) a surface layer comprising a lithium metal composite oxide having a spinel crystal structure represented by space group Fd-3m, and
   (b) an internal portion comprising a lithium metal composite oxide having a spinel crystal structure represented by space group P4$_3$32.

2. The positive electrode active material for a secondary battery according to claim 1, wherein
   (a) the surface layer comprises a lithium metal composite oxide having a crystal structure represented by space group Fd-3m and represented by formula (1):

$$Li_{a1}(M1_{x1}Mn_{2-x1-y1}Y1_{y1})O_4 \quad (1)$$

wherein, $0.4 \leq x1 \leq 1.2$, $0 \leq y1 \leq 1$, $x1+y1<2$, $0 \leq a1 \leq 1.2$; M1 comprises at least one selected from the group consisting of Co, Ni, Fe, Cr and Cu; Y1 is at least one selected from the group consisting of Li, B, Na, Al, Mg, Ti, Si, K and Ca; and
   (b) the internal portion comprises a lithium metal composite oxide having a crystal structure represented by space group P4$_3$32 and represented by formula (2):

$$Li_{a2}(M2_{x2}Mn_{2-x2-y2}Y2_{y2})O_4 \quad (2)$$

wherein, $0.4 \leq x2 \leq 1.2$, $0 \leq y2 \leq 1$, $x2+y2<2$, $0 \leq a2 \leq 1.2$; and M2 comprises at least one selected from the group consisting of Co, Ni, Fe, Cr and Cu; Y2 is at least one selected from the group consisting of Li, B, Na, Al, Mg, Ti, Si, K and Ca.

3. The positive electrode active material for a secondary battery according to claim 1, wherein the surface layer having a crystal structure of Fd-3m has a thickness in a range of 1 nm of more and 1 μm or less.

4. The positive electrode active material for a secondary battery according to claim 2, wherein in the general formula (1), M1 comprises at least Ni.

5. The positive electrode active material for a secondary battery according to claim 2, wherein in the general formula (2), M2 comprises at least Ni.

6. The positive electrode active material for a secondary battery according to claim 2, wherein in the general formula (1), $0.45<x1<0.8$ is satisfied.

7. The positive electrode active material for a secondary battery according to claim 2, wherein in the general formula (2), $0.45<x2<0.55$ is satisfied.

8. The positive electrode active material for a secondary battery according to claim 2, wherein in the general formula (1), $0 \leq y1 \leq 0.3$ is satisfied.

9. The positive electrode active material for a secondary battery according to claim 2, wherein in the general formula (2), $0 \leq y2 \leq 0.3$ is satisfied.

10. A positive electrode comprising the positive electrode active material for a secondary battery according to claim 1.

11. A secondary battery comprising the positive electrode according to claim 10.

12. A process for producing a positive electrode active material for a secondary battery, comprising the steps of:
    (A) forming a particle comprising a lithium metal composite oxide having a spinel crystal structure represented by space group of P4$_3$32; and
    (B) on the surface of the particles, forming a surface layer comprising a lithium metal composite oxide having a spinel crystal structure represented by space group Fd-3m.

13. The process for producing a positive electrode active material for a secondary battery according to claim 12, wherein
    the particle forming step (A) comprises forming a particle comprising a lithium metal composite oxide having a crystal structure represented by space group P4$_3$32 and represented by formula (2):

$$Li_{a2}(M2_{x2}Mn_{2-x2-y2}Y2_{y2})O_4 \quad (2)$$

wherein, $0.4 \leq x2 \leq 1.2$, $0 \leq y2 \leq 1$, $x2+y2<2$, $0 \leq a2 \leq 1.2$; and M2 comprises at least one selected from the group consisting of Co, Ni, Fe, Cr and Cu; Y2 is at least one selected from the group consisting of Li, B, Na, Al, Mg, Ti, Si, K and Ca; and
    the surface layer forming step (B) comprises forming on a surface of the particle a surface layer comprising a lithium metal composite oxide having a crystal structure represented by space group Fd-3m and represented by formula (1):

$$Li_{a1}(M1_{x1}Mn_{2-x1-y1}Y1_{y1})O_4 \quad (1)$$

wherein, $0.4 \leq x1 \leq 1.2$, $0 \leq y1 \leq 1$, $x1+y1<2$, $0 \leq a1 \leq 1.2$; M1 comprises at least one selected from the group consisting of Co, Ni, Fe, Cr and Cu; Y1 is at least one selected from the group consisting of Li, B, Na, Al, Mg, Ti, Si, K and Ca.

14. The process for producing a positive electrode active material for a secondary battery according to claim 13, comprising:
- in the step (A), forming the particle comprising the lithium metal composite oxide, and thereafter,
- in the step (B), to the particle prepared in the step (A), adhering solution, dispersion or powder comprising Li, Mn, an element represented by M1 in formula (1), and if y1 is not 0 an element represented by Y1 in formula (1), and subjecting drying and calcining.

15. The process for producing a positive electrode active material for a secondary battery according to claim 13, wherein the surface layer having a crystal structure of Fd-3m is formed in a thickness in a range of 1 nm or more and 1 μm or less.

\* \* \* \* \*